United States Patent [19]

Smith et al.

[11] Patent Number: 5,139,896

[45] Date of Patent: Aug. 18, 1992

[54] ALL CERAMIC STRUCTURE FOR MOLTEN CARBONATE FUEL CELL

[75] Inventors: James L. Smith, Lemont; Eugenia H. Kucera, Downers Grove, both of Ill.

[73] Assignee: The United States of America as represented by the United States Department of Energy, Washington, D.C.

[21] Appl. No.: 685,759

[22] Filed: Apr. 16, 1991

Related U.S. Application Data

[63] Continuation-in-part of Ser. No. 357,247, May 26, 1989, Pat. No. 5,008,163.

[51] Int. Cl.$^5$ .................. H01M 8/14; H01M 4/90
[52] U.S. Cl. .................................... 429/40; 429/16
[58] Field of Search ............................ 429/40, 16

[56] References Cited

U.S. PATENT DOCUMENTS

| | | | |
|---|---|---|---|
| 4,317,866 | 3/1982 | Trocciola et al. | 429/16 X |
| 4,564,567 | 1/1986 | Kucera et al. | 429/45 X |
| 4,714,661 | 12/1987 | Kaun et al. | 429/16 X |
| 4,818,639 | 4/1989 | Kunz | 429/16 X |
| 4,992,341 | 2/1991 | Smith et al. | 429/40 |

*Primary Examiner*—Stephen Kalafut
*Attorney, Agent, or Firm*—Mark P. Dvorscak; Robert J. Fisher; William R. Moser

[57] ABSTRACT

An all-ceramic molten carbonate fuel cell having a composition formed of a multivalent metal oxide or oxygenate such as an alkali metal, transition metal oxygenate. The structure includes an anode and cathode separated by an electronically conductive interconnect. The electrodes and interconnect are compositions ceramic materials. Various combinations of ceramic compositions for the anode, cathode and interconnect are disclosed. The fuel cell exhibits stability in the fuel gas and oxidizing environments. It presents reduced sealing and expansion problems in fabrication and has improved long-term corrosion resistance.

11 Claims, 2 Drawing Sheets

ALL CERAMIC STRUCTURE FOR MOLTEN CARBONATE FUEL CELL

CONTRACTUAL ORIGIN OF THE INVENTION

The United States Government has rights in this invention pursuant to Contract No. W-31-109-ENG-38 between the U.S. Department of Energy and the University of Chicago.

REFERENCE TO RELATED APPLICATIONS

This is a continuation-in-part of copending U.S. application Ser. No. 357,247, filed May 26, 1989, and allowed on Nov. 7, 1990, entitled "Conductive Ceramic Composition and Method of Preparation", now U.S. Pat. No. 5,008,163 the disclosure of which is incorporated herein by reference.

BACKGROUND OF THE INVENTION

This invention relates to ceramic compositions having chemical stability and electronic conductivity at elevated temperatures. In particular, it relates to an all ceramic structure for a molten carbonate fuel cell and to compositions for use in other reducing and oxidizing environments at elevated temperatures.

Previous molten carbonate fuel cells have included an anode such as porous nickel, a cathode such as porous lithiated nickel oxide, a metallic interconnect, and molten carbonate as an electrolyte retained in a porous matrix. A representative electrolyte is a mixture of $Li_2CO_3$ and $K_2CO_3$. Typical operating temperatures of such molten temperatures are between 600°-700° C. and at such elevated temperatures there has been loss of physical stability of the anode structure over extended periods of operation, and corrosion of the interconnect.

Nickel metal as anode material is chemically, but not mechanically stable. A porous nickel anode will creep at the cell operating temperature and the required mechanical loading, resulting in reduced porosity. This problem has been addressed by alloying the nickel with chromium or aluminum, for creep resistance, but with accompanying increased cost and effort in anode production. Other efforts have involved plating ceramic particles with nickel to provide a hard core. Unfortunately, the nickel plating tends not to wet the ceramic and to coalesce into islands of nickel on otherwise uncoated particles.

Present designs of molten carbonate fuel cells including a nickel anode, a metal separator as an interconnect, a cathode with a dopant, and an electrolyte matrix of $LiAlO_2$ ceramic, experience thermal expansion and sealing problems during fabrication, and corrosion of the interconnect during long-term operation. Performance improvement and increased range of viable applications will result from the use of a unitary material for all of the components, including wider temperature operating range.

The present inventors, jointly with Sim, have reported stable, electronically conductive ceramic cathode compositions in U.S. Pat. No. 4,564,567, which patent is incorporated herein by reference. These cathode compositions involved lithium-transition metal oxygenates with suitable dopants to increase their electrical conductivity to a level for molten carbonate cathode use. The inventors subsequently reported ceramic anode compositions in co-pending U.S. application Ser. No. 357,247 that are chemically stable in the molten alkali metal carbonate fuel cell. The anode compositions involve alkali metal-transition metal oxygenates in non-stoichiometric relation. Ceramics which are stable in both anode and cathode gases, and conductive in both environments, and the incorporation of a ceramic rather than a metallic separator sheet are herein disclosed. This disclosure incorporates the ceramic cathode compositions of U.S. Pat. No. 4,564,567, the ceramic anode compositions of copending U.S. application Serial No. 357,247, and further provides for a unitary, all-ceramic molten carbonate fuel cell.

Therefore, in view of the above, it is an object of the present invention to provide an electrically conductive ceramic structure of such compositions that are stable in the fuel gas and oxidizing environments.

It is a further object to provide a molten carbonate fuel cell with high power density in a nearly optimum temperature range and which has a wide range of applications.

Yet another object of the present invention is to provide a molten carbonate fuel cell that presents reduced sealing and expansion problems in fabrication.

Another object is to provide a molten carbonate fuel cell having improved corrosion resistance.

SUMMARY OF THE INVENTION

This invention provides a unitized molten carbonate fuel cell having repeated layers of an anode, a cathode separated by an interconnect, an electrolyte adjacent to the cathode and anode, in which the anode, cathode, and interconnect are all composed of ceramic compositions. The ceramic composition includes a multivalent metal oxide, including an alkali metal-transition metal oxygenate, with the ratio of oxygen to multivalent metal in non-stoichiometric relations, depending on the gaseous environment. Such ceramic compositions exhibit electrical conductivity substantially greater than the electrical conductivity of a corresponding stoichiometric composition with balanced oxygen.

In more particular aspects of the invention, compositions for the all-ceramic fuel cell are selected from the groups of compounds disclosed in U.S. Pat. No. 4,564,567, and co-pending application Ser. No. 357,247. For example, the fuel cell composition could be a variant of $LiFeO_2$, characterized by a lattice constant of more than that of stoichiometric $LiFeO_2$ (i.e. 4.158 angstroms) but, no more than about 4.2 angstroms determined by x-ray diffraction and further characterized by electrical conductivity of more than 0.003 $(ohm-cm)^{-1}$ at about 700° C.

Another contemplation of the invention involves an all ceramic fuel cell of compositions including $A_xT_yO_z$, where A is an alkali metal, T is a transition metal, and O is Oxygen, and x, y, and z are in non-stoichiometric relation, the composition exhibiting substantially greater electrical conductivity due to the non-stoichiometry. The compositions can also be doped to increase conductivity or electronic stability.

Further aspects of the invention include various combinations of ceramic compositions for an all-ceramic molten carbonate fuel cell. The anode, cathode, and interconnect can all comprise the same ceramic composition in the presence of the same dopant. Alternatively, the anode, cathode, and interconnect could all comprise the same ceramic composition, and the interconnect can contain a first dopant on its side adjacent the anode, and a second dopant on its side adjacent the cathode. In another variation, the anode and cathode can comprise different ceramic compositions but each have the same parent cation. The anode, cathode, and interconnect can be doped with this same cation. Additionally, the anode and cathode can each comprise different ceramic compositions, and the interconnect can contain a first dopant on its side adjacent the anode, and a second dopant on its side adjacent the cathode.

BRIEF DESCRIPTION OF THE DRAWINGS

The present invention is illustrated in the accompanying drawings wherein.

DETAILED DESCRIPTION OF THE INVENTION

Figure 1:
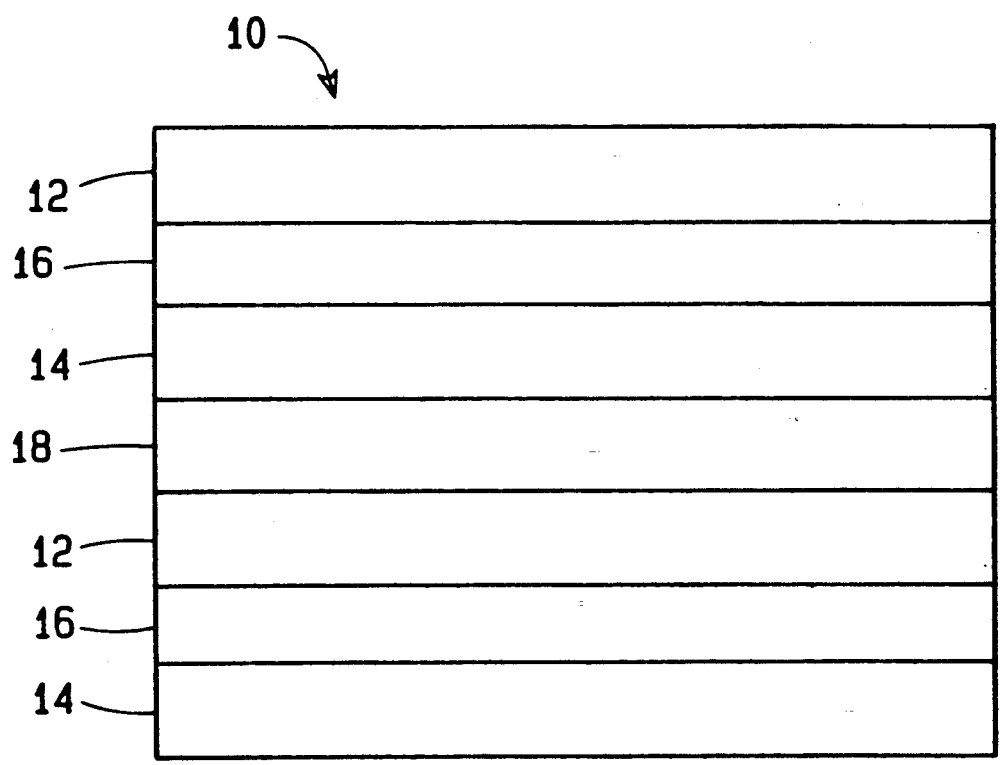
FIG. 1 is a cross-sectional schematic view of an all-ceramic compositions layered for use in a molten carbonate fuel cell.

FIG. 1 provides an illustration of the representative fuel cell incorporating one embodiment of the invention. As illustrated, fuel cell 10 includes a repeating pattern of components. These components include two electrodes: an electronically conductive, porous ceramic anode 12, and an electronically conductive, porous ceramic cathode 14. The porosity of the cathode and anode permits the passage of oxidant gas and fuel gas, respectively. An interconnect 16 separates the anode and cathode. The interconnect is an electronically conductive separator sheet, which is sufficiently dense to block the passage of oxidant and fuel gases. Typically, the anode 12 and cathode 14 have a dual porosity provided by pores of about 10–150 microns and micropores from submicron up to about 5 microns diameter. Representative thicknesses for the anode 12, and cathode 14, are about 0.02 to 0.07 cm., while the interconnect 16 has a thickness range of about 0.025 to 0.1 cm. Adjacent to the cathode 14 is an electrolyte structure 18 containing a matrix material of $LiAlO_2$ ceramic and molten alkali carbonates. The electrolyte 18 has a thickness range of about 0.025 to 0.1 cm.

The fuel cell 10 is composed of an all ceramic structure in which both electrodes 12 and 14, and interconnect 16 are composed of ceramic materials. Preferably, the anode, cathode and interconnect could be composed primarily of the same or similar material. In particular, the composition of the interconnect separator sheet 16 adjacent each electrode 12 and 14 would essentially be the same as the composition of that electrode. This arrangement reduces sealing and expansion problems associated with the use of different materials.

The composition of the fuel cell 10 can be varied. The anode, interconnect, and cathode can all consist of the same material in the presence of the same dopant. An example of this type of fuel cell composition would be $LiFeO_2$ doped with Mn.

Additionally, the anode, cathode, and interconnect can comprise the same ceramic composition, with the interconnect containing a first dopant on its side adjacent the anode, and a second dopant on its side adjacent the cathode. As an example, the anode, cathode, and interconnect can be composed of $LiFeO_2$, and the interconnect could be doped with Nb on its anode side and Mn on its cathode side. In this arrangement, the anode and cathode could also contain a dopant: the anode would be doped with the first dopant, and the cathode would be doped with the second dopant. Further to the provided example, the anode would be doped with Nb and the cathode would be doped with Mn.

It is also possible to provide a fuel cell in which the anode, cathode, and interconnect each comprise different ceramic compositions doped with the same or, different dopants. For example, the anode could be MnO doped with Nb, and the cathode could be $LiFeO_2$ doped with Mn. The interconnect would be a gradation of Nb doped MnO on its anode side to Mn doped $LiFeO_2$ on its cathode side.

A further possibility for the composition of the fuel cell includes an anode and cathode of different compositions each having the same parent cation, for example Nb doped MnO on the anode side and Nb doped $Li_2MnO_3$ on the cathode side.

The interconnect can also consist of a precise doped composition of ceramic on the cathode side which is the same as the cathode 14; and of a precise doped composition on the anode side which is the same as the anode 12. As an example, the anode could consist of $Li_3NbO_4$, and the cathode could be $LiFeO_2$. The interconnect would be a gradation of these two compositions, consisting of $Li_3NbO_4$ on its anode side and of $LiFeO_2$ on its cathode side.

Gradations of other compositions are possible. The specific and precise compositions of each component are dictated by its gaseous, carbonate environment.

The anode, cathode, and interconnect compositions are selected from the oxides of the multivalent metals such as the transition metals, the lanthanides and the transuranic elements. Preferably the transition metal ceramics are selected in view of the cost and the handling problems encountered with the latter identified series. Alkali metal-transition metal oxygenates are contemplated as suitable for use. Such fuel cell compositions can be defined by the following formula:

$$A_xT_yO_z,$$

where A is an alkali metal,

T is a transition metal, and

O is Oxygen, and x, y, and z are in non-stoichiometric relation. The value of x can be any value including zero.

The inventors have previously disclosed ceramic compositions that are chemically stable in both the anode and cathode gas. Cathode compositions can be prepared in typical oxidant gases, while the anode compositions can be prepared in a reducing gas atmosphere biased by the presence of an oxygen producing equilibrium. For example, the presence of minor proportions of $H_2O$, and $CO_2$ in a $H_2$ gas blanket can limit lithium loss and prevent the complete reduction of many ceramic compositions previously considered unsuitable for use.

Conductive ceramics exist in both the anode and cathode environments, and thus it is possible to produce a cell structure that contains no metal. Ceramic compositions can be selected for use from oxides and oxygenates or transition metals as listed in Table I. Table I lists stable compounds for use in the all ceramic fuel cell.

TABLE I

| Cathode (Oxidizing Environment) | Anode (Reducing Environment) |
| --- | --- |
| $LiFeO_2$ | $LiFeO_2$ |
| $Li_2MnO_3$ | $MnO$ |
| $Li_2TiO_3$ | $Li_2TiO_3$ |
| $Li_3TaO_4$ | $Li_3TaO_4$ |
| $Li_3VO_4$ | $Li_3VO_4$ |
| $Li_3NbO_4$ | $Li_3NbO_4$ |
| $Li_2ZrO_3$ | $Li_2ZrO_3$ |
| $CeO_2$ | $CeO_2$ |

Due to inherent characteristics of the cell, there are numerous design options for a molten carbonate fuel cell with an all-ceramic structure. For example, fabrication possibilities are made available due to the fact that conduction between the electrolyte and either electrode is via a liquid phase. Thus, degree of bonding in these areas is entirely at the discretion of the designer/fabricator. It can range from mechanical contact only to strong bonds. Additionally, the preferred electrode design of ceramic fiber based porous bodies tends to better accommodate thermal expansion mismatches than other microstructures. If stress problems exist due to the bond between either or both electrodes and the electrolyte structure, an intentionally weak bond can be made at these junctures. The probability is however, that a problem will not exist due to the fibrous nature of the electrodes, and if desired, the electrolyte as well.

Figure 2:
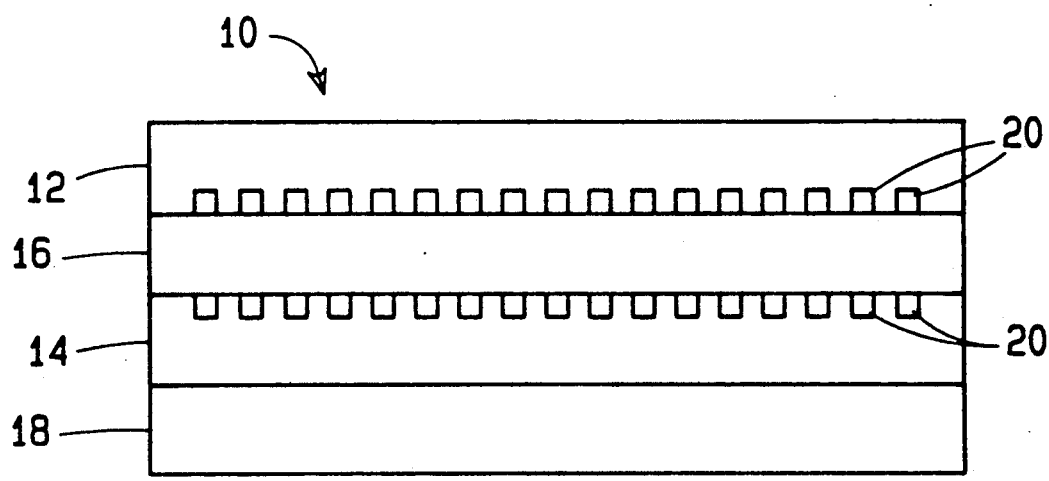
FIG. 2 is a cross-sectional schematic view of an all-ceramic molten carbonate fuel cell with gas channels incorporated in the electrodes; and, FIG. 3 is a cross-sectional schematic view of an all-ceramic molten carbonate fuel cell in which the layers are convoluted.
Figure 3:
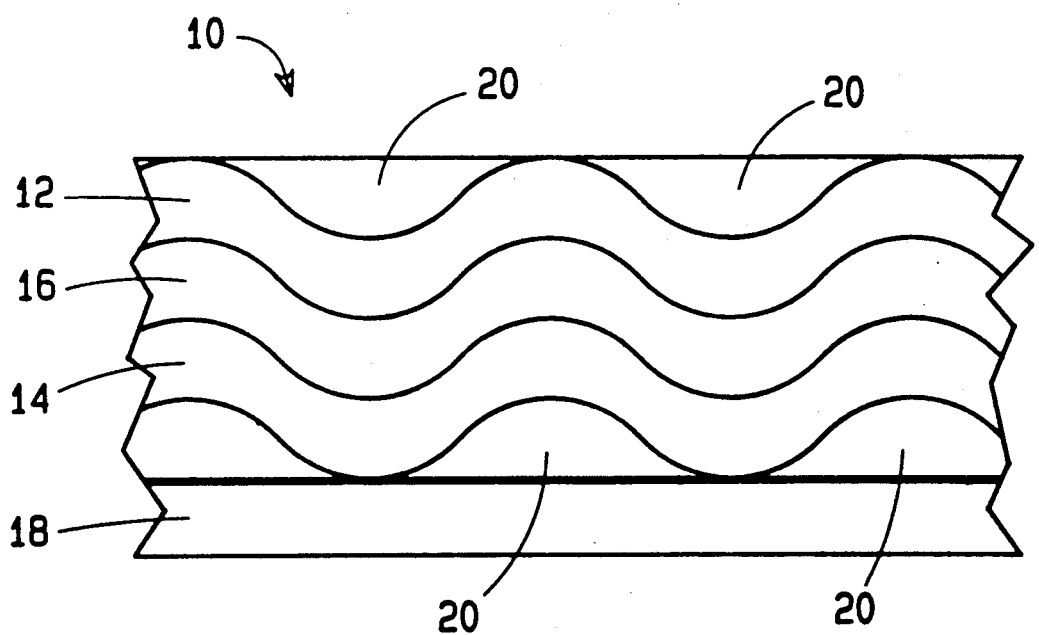

The cathode/separator/anode problems are minimized due to the use of ceramic materials for all three components, the fibrous nature of the electrodes, and the relatively low temperature of operation. As shown in FIG. 3, this three-part component can be convoluted, or, as shown in FIG. 2, gas channels 20 can be cast into the porous electrodes. It is understood that the components shown in FIGS. 2 and 3 are arranged in a repeating pattern as depicted in FIG. 1.

The full range of design options available to SOFC (solid oxide fuel cells) are available to this unitary MCFC, with several additional benefits which accrue due to unique characteristics of the components (similar or identical materials, bonding options, and fiber-based components). Performance improvement and increased range of viable applications will result from the lower temperature operation.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which exclusive property rights or privileges are claimed are defined as follows:

1. A molten carbonate fuel cell comprising: a sequential arrangement of an anode layer, an interconnect, a cathode layer, and an electrolyte in a repeating pattern, and wherein the anode, cathode, and interconnect are composed of ceramic compositions.

2. The molten carbonate fuel cell of claim 1 wherein the ceramic compositions are chemically stable in molten alkali metal carbonates and fuel cell gaseous and thermal environments.

3. A molten carbonate fuel cell comprising: a sequential arrangement of an anode, an interconnect, a cathode, and an electrolyte in a repeating pattern, and wherein the anode, cathode, and interconnect are composed of ceramic compositions having the following formula:

$$A_xT_yO_z,$$

where A is an alkali metal,
T is a transition metal, and
O is Oxygen,
and x, y, and z are in non-stoichiometric relation, the compositions exhibiting substantially greater electrical conductivity due to the non-stoichiometry and the presence of a dopant.

4. The molten carbonate fuel cell of claim 3 wherein the anode, cathode, and interconnect all comprise the same ceramic composition in the presence of the same dopant.

5. The molten carbonate fuel cell of claim 3 wherein the anode, cathode, and interconnect all comprise the same ceramic composition, and further wherein the anode, cathode, and interconnect are doped.

6. The molten carbonate fuel cell of claim 3 wherein the anode and cathode comprise different ceramic compositions, and the interconnect comprises a gradation of the anode composition from its side adjacent the anode to the cathode composition adjacent the cathode, and further where the anode, cathode, and interconnect are doped.

7. The molten carbonate fuel cell of claim 6 wherein the interconnect contains a first dopant on its side adjacent the anode, and a second dopant on its side adjacent the cathode.

8. The molten carbonate fuel cell of claim 5 wherein the anode is doped with the first dopant, and the cathode is doped with the second dopant.

9. The molten carbonate fuel cell of claim 6 wherein the anode, cathode, and interconnect are doped with the same cation.

10. The molten carbonate fuel cell of claim 6 wherein the anode, cathode, and interconnect are doped with different cations.

11. The molten carbonate fuel cell of claim 7 wherein the interconnect contains the same dopant as the anode on its side adjacent the anode, and the same dopant as the cathode on its side adjacent the cathode.

* * * * *